(12) United States Patent
Kim et al.

(10) Patent No.: US 11,851,448 B2
(45) Date of Patent: Dec. 26, 2023

(54) BORON-CONTAINING COMPOUND AND ELECTROLYTE ADDITIVE FOR SECONDARY BATTERY CONTAINING THE SAME

(71) Applicant: SK On Co., Ltd., Seoul (KR)

(72) Inventors: Myoung Lae Kim, Daejeon (KR); Chanwoo Kim, Daejeon (KR); Yu Na Shim, Daejeon (KR); Jaechan Ryu, Daejeon (KR); Cholho Lee, Daejeon (KR); Han Sol Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/075,610

(22) Filed: Dec. 6, 2022

(65) Prior Publication Data
US 2023/0174557 A1 Jun. 8, 2023

(30) Foreign Application Priority Data
Dec. 6, 2021 (KR) .......... 10-2021-0172810

(51) Int. Cl.
*C07F 5/02* (2006.01)

(52) U.S. Cl.
CPC .................. *C07F 5/022* (2013.01)

(58) Field of Classification Search
CPC ...................................... C07F 5/022
See application file for complete search history.

(56) References Cited

U.S. PATENT DOCUMENTS 3,267,126 A * 8/1966 Weil .......... C07F 5/04
558/290

FOREIGN PATENT DOCUMENTS

JP 2013-068944 A 4/2013

OTHER PUBLICATIONS

European Search Report for European Patent Application No. 22210830.0 issued by the European Patent Office dated Apr. 13, 2023.

* cited by examiner

*Primary Examiner* — Golam M Shameem
(74) *Attorney, Agent, or Firm* — IP & T GROUP LLP (57) ABSTRACT

The present disclosure relates to a novel boron-containing compound and an electrolyte additive for a secondary battery containing the same. An electrolyte for a secondary battery provided in one embodiment contains the novel boron-containing compound, such that decomposition of the electrolyte may be suppressed, thereby improving a capacity and a lifespan of the battery.

13 Claims, 2 Drawing Sheets

BORON-CONTAINING COMPOUND AND ELECTROLYTE ADDITIVE FOR SECONDARY BATTERY CONTAINING THE SAME

CROSS-REFERENCE TO RELATED APPLICATIONS

This application claims priority under 35 U.S.C. § 119 to Korean Patent Application No. 10-2021-0172810, filed on Dec. 6, 2021, in the Korean Intellectual Property Office, the disclosure of which is incorporated herein by reference in its entirety.

TECHNICAL FIELD

The following disclosure relates to a novel boron-containing compound and an electrolyte additive for a secondary battery containing the same.

BACKGROUND

A lithium secondary battery has high potential for use as a power source for a portable electronic device or the like because it has a higher energy density than other batteries and may implement miniaturization and lightness. The lithium secondary battery may include a cathode, an anode, and an electrolyte.

Recently, in accordance with an increase in demand for a secondary battery having a high output and a high capacity such as a secondary battery for an electric vehicle, there is a need for development of a lithium secondary battery including an electrolyte capable of suppressing a side reaction between an electrode and the electrolyte in a severe environment such as a high temperature environment, or securing high thermal and chemical stability to prevent ignition or explosion.

SUMMARY

An embodiment is directed to providing a novel boron-containing compound.

Another embodiment is directed to providing an electrolyte additive for a secondary battery containing a boron-containing compound.

Still another embodiment is directed to providing an electrolyte containing the electrolyte additive for a secondary battery, and a secondary battery including the same.

In one general aspect, there is provided a compound represented by the following Chemical Formula 1:

[Chemical Formula 1]

[Chemical Formula 2]

in Chemical Formula 1, $X^1$ and $X^2$ are each independently a substituted or unsubstituted compound represented by Chemical Formula 2 or substituted or unsubstituted $C_{2-13}$ alkenyl;

n and m are each independently an integer of 0 to 15, and A is a bond or $-C(=O)-$;

x is an integer of 0 to 4;

y is an integer of 1 to 4;

Y's are each independently a bond, $-CH_2-$, or $-CH_2CH_2-$; and

M is an alkali metal.

In another general aspect, an electrolyte additive for a secondary battery contains a compound represented by the following Chemical Formula 1:

[Chemical Formula 1]

In this case, $X^1$, $X^2$, Y, and M may be as described above.

In still another general aspect, an electrolyte for a secondary battery contains the electrolyte additive for a secondary battery.

In still another general aspect, a secondary battery includes the electrolyte for a secondary battery.

Other features and aspects will be apparent from the following detailed description, the drawings, and the claims.

DETAILED DESCRIPTION OF EMBODIMENTS

Exemplary embodiments of the present disclosure may be modified in many different forms and the scope of the present disclosure should not be limited to exemplary embodiments described below. In addition, the exemplary embodiments of the present disclosure are provided in order to further completely describe the present disclosure to those skilled in the art. Furthermore, in the entire specification, unless explicitly described otherwise, "comprising" any components will be understood to imply the inclusion of other components rather than the exclusion of any other components.

In one embodiment, there is provided a compound represented by the following Chemical Formula 1:

[Chemical Formula 1]

[Chemical Formula 2]

in Chemical Formula 1, $X^1$ and $X^2$ are each independently a substituted or unsubstituted compound represented by Chemical Formula 2 or substituted or unsubstituted $C_{2-15}$ alkenyl;

n and m are each independently an integer of 0 to 15, and A is a bond or —C(=O)—;

x is an integer of 0 to 4;

y is an integer of 1 to 4;

Y's are each independently a bond, —CH$_2$—, or —CH$_2$CH$_2$—; and

M is an alkali metal.

In this case, the substitutions may be each independently performed with one or more of —OH, —CN, —NH$_2$, —NO$_2$, halogen, linear or branched $C_{1-20}$ alkyl, linear or branched $C_{1-20}$ alkylamino, linear or branched $C_{2-20}$ alkenyl, linear or branched $C_{1-20}$ alkoxy, linear or branched $C_{1-20}$ alkylcarbonyl, $C_{3-20}$ cycloalkyl, 3- to 10-membered heterocycloalkyl containing one or more heteroatoms selected from the group consisting of N, O, and S, $C_{5-20}$ aryl, and 5- to 10-membered heteroaryl containing one or more heteroatoms selected from N, O, and S, but are not limited thereto.

In one embodiment, $X^1$ and $X^2$ may be each independently a substituted or unsubstituted compound represented by Chemical Formula 2 or substituted or unsubstituted $C_{2-10}$ alkenyl;

n and m may be each independently an integer of 0 to 10, and A may be a bond;

x and y may be each independently an integer of 1 to 3; and

Y's may be each independently a bond or —CH$_2$—.

Alternatively, $X^1$ and $X^2$ may be each independently substituted or unsubstituted $C_{2-8}$ alkenyl, substituted or unsubstituted $C_{2-6}$ alkenyl, substituted or unsubstituted $C_{2-5}$ alkenyl, or substituted or unsubstituted $C_{2-3}$ alkenyl. In this case, the alkenyl may have a direct linkage with unsaturated carbon or a linkage with unsaturated carbon via alkylene. For example, the unsaturated carbon may be present at the end of the chain.

n and m may be each independently an integer of 0 to 8, an integer of 0 to 5, an integer of 0 to 3, an integer of 0 to 2, 0, 1, or 2.

M may be lithium, sodium, potassium, or cesium.

The compound represented by Chemical Formula 1 may be any one selected from the group consisting of compounds represented by the following Chemical Formulas (1) to (7):

(1)

In another embodiment, there is provided an electrolyte additive for a secondary battery containing a compound represented by the following Chemical Formula 1:

[Chemical Formula 1]

[Chemical Formula 2]

in Chemical Formula 1, $X^1$ and $X^2$ are each independently a substituted or unsubstituted compound represented by Chemical Formula 2 or substituted or unsubstituted $C_{2-15}$ alkenyl;

n and m are each independently an integer of 0 to 15, and
A is a bond or —C(=O)—;
x is an integer of 0 to 4;
y is an integer of 1 to 4;
Y's are each independently a bond, —CH$_2$—, or —CH$_2$CH$_2$—; and
M is an alkali metal.

In this case, X$^1$, X$^2$, Y, M, n, and m may be applied as described above.

The electrolyte additive for a secondary battery may contain the compound represented by Chemical Formula 1 as a monomer, and may contain an oligomer or polymer prepared from the monomer, a polymerization initiator, a solvent, and the like. The oligomers may be bound through a polymerization reaction to form a network.

A weight average molecular weight of the oligomer or polymer prepared from the monomer may be, for example, about 1,000 to 30,000, about 1,000 to 25,000, about 1,000 to 20,000, or about 5,000 to 20,000, but is not limited thereto.

The compound represented by Chemical Formula 1 may be contained in an amount of 0.01 to 30 wt %, 0.01 to 20 wt %, 0.01 to 10 wt %, 0.05 to 20 wt %, 0.1 to 20 wt %, 0.1 to 15 wt %, 0.1 to 10 wt %, or 1 to 10 wt %, with respect to the total weight of the electrolyte additive for a secondary battery, but is not limited thereto.

The polymerization initiator may be used to form a polymer by polymerizing the monomer or oligomer, and a general polymerization initiator known in the art may be used without limitation. For example, depending on the type of polymerization, a photo-polymerization initiator or a thermal polymerization initiator may be used. Specific examples of the photo-polymerization initiator include one or more selected from the group consisting of 2-hydroxy-2-methylpropiophenone (HMPP), 1-hydroxycyclohexyl phenyl ketone, benzophenone, 2-hydroxy-1-[4-(2-hydroxyethoxy)phenyl]-2-methyl-1-propanone, 2-[2-oxo-2-phenylacetoxyethoxy]ethyl oxyphenylacetate, 2-[2-hydroxyethoxy]ethyl oxyphenylacetate, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)phosphine oxide, bis(2,4,6-trimethylbenzoyl)phenyl phosphine oxide, bis(etha5-2,4-cyclopentadien-1-yl), bis[2,6-difluoro-3-(1H-pyrrol-1-yl) phenyl]titanium, 4-isobutylphenyl-4'-methylphenyliodonium hexafluorophosphate, and methyl benzoylformate. Representative examples of the thermal polymerization initiator include one or more selected from the group consisting of benzoyl peroxide, acetyl peroxide, dilauroyl peroxide, di-tert-butylperoxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(isobutyronitrile) (AIBN), and 2,2'-azobis(dimethylvaleronitrile) (AMVN).

The solvent is not particularly limited as long as it is an electrolyte solvent commonly used in a secondary battery. For example, ethers, esters (acetates and propionates), amides, linear carbonates or cyclic carbonates, and nitriles (acetonitrile, SN, and the like) may be used alone or in combination of two or more thereof.

As the ester compound, methyl acetate, ethyl acetate, n-propyl acetate, dimethyl acetate, methyl propionate, ethyl propionate, γ-butyrolactone, decanolide, valerolactone, mevalonolactone, caprolactone, methyl formate, or the like may be used.

Examples of the linear carbonate compound include diethyl carbonate (DEC), dimethyl carbonate (DMC), dipropyl carbonate (DPC), methylpropyl carbonate (MPC), ethylpropyl carbonate (EPC), ethylmethyl carbonate (EMC), and a combination thereof. Examples of the cyclic carbonate compound include ethylene carbonate (EC), propylene carbonate (PC), butylene carbonate (BC), vinylethylene carbonate (VEC), and a combination thereof.

In still another embodiment, there is provided an electrolyte for a secondary battery containing the electrolyte additive for a secondary battery.

The electrolyte for a secondary battery may further contain other additives, inorganic particles, and the like known in the art to increase efficiency of the secondary battery and reduce resistance.

For example, the electrolyte for a secondary battery may further contain, as other additives, an oxalatophosphate-based compound, an oxalatoborate-based compound, a fluorine-substituted carbonate-based compound, a vinylidene carbonate-based compound, or a sulfinyl group-containing compound. Alternatively, the electrolyte for a secondary battery may further contain, for example, lithium tetrafluoro(oxalato)phosphate (LiTFOP), lithium difluorobis(oxalato)phosphate (LiDFOP), lithium difluoro(oxalato)borate (LiDFOB), lithium bis(oxalato)borate (LiB(C$_2$O$_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, or propene sultone (PRS). In one embodiment, the compound or the oligomer using the compound as a monomer may be further reacted with other additives in the electrolyte.

The oxalatoborate-based compound may be a compound represented by the following Chemical Formula 3 or lithium bisoxalatoborate (LiB(C$_2$O$_4$)$_2$, LiBOB).

[Chemical Formula 3]

In Chemical Formula 3, R$_{21}$ and R$_{22}$ may be each independently halogen or halo C$_{1-10}$ alkyl. Specific examples of the oxalatoborate-based compound include lithium difluoro(oxalato)borate (LiB(C$_2$O$_4$)F$_2$, LiDFOB) and lithium bis(oxalato) borate (LiB(C$_2$O$_4$)$_2$, LiBOB).

The oxalatophosphate-based compound may be a compound represented by the following Chemical Formula 4 or lithium difluorobis(oxalato)phosphate (LiDFOP).

[Chemical Formula 4]

In Chemical Formula 4, R$_{23}$ to R$_{26}$ may be each independently halogen or halo C$_{1-10}$ alkyl. Specific examples of the oxalatophosphate-based compound include lithium tetrafluoro(oxalato)phosphate (LiTFOP) and lithium difluorobis(oxalato)phosphate (LiDFOP).

The fluorine-substituted carbonate-based compound may be fluoroethylene carbonate (FEC), difluoroethylene carbonate (DFEC), fluorodimethyl carbonate (FDMC), fluoroethylmethyl carbonate (FEMC), or a combination thereof.

The vinylidene carbonate-based compound may be vinylene carbonate (VC), vinyl ethylene carbonate (VEC), or a mixture thereof.

The sulfinyl group (S=O)-containing compound may be sulfone, sulfite, sulfonate, or sultone (cyclic sulfonate), and these compounds may be used alone or as a mixture. Specifically, the sulfone may be represented by the following Chemical Formula 5, and may be divinyl sulfone. The sulfite may be represented by the following Chemical Formula 6, and may be ethylene sulfite or propylene sulfite. The sulfonate may be represented by the following Chemical Formula 7, and may be diallyl sulfonate. In addition, non-limiting examples of the sultone include ethane sultone, propane sultone, butane sultone, ethene sultone, butene sultone, and propene sultone.

[Chemical Formula 5]

[Chemical Formula 6]

[Chemical Formula 7]

In Chemical Formulas 5 to 7, $R_{27}$ and $R_{28}$ may be each independently hydrogen, halogen, $C_{1-10}$ alkyl, $C_{2-10}$ alkenyl, halo $C_{1-10}$ alkyl, or halo $C_{2-10}$ alkenyl.

The inorganic particles may be formed of a single compound or a mixture of two or more compounds selected from the group consisting of $BaTiO_3$, $Pb(Zr, Ti)O_3$ (PZT), $Pb_{1-a}La_aZr_{1-b}TibO_3$ (PLZT, where $0<a<1$, $0<b<1$), $Pb(Mg_{1/3}Nb_{2/3})O_3-PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC, and a mixture thereof, or $(LiAlTiP)_{a2}O_{b2}$-based glass ($0<a2<4$, $0<b2<13$) such as lithium phosphate ($Li_3PO_4$), lithium titanium phosphate ($Li_cTi_d(PO_4)_3$, $0<c<2$, $0<d<3$), lithium aluminum titanium phosphate ($Li_{a1}Al_{b1}Ti_{c1}(PO_4)_3$, $0<a1<2$, $0<b1<1$, $0<c1<3$), or $14Li_2O-9Al_2O_3-38TiO_2-39P_2O_5$, $SiS_2$-based glass ($Li_{a6}Si_{b6}S_{c3}$, $0<a6<3$, $0<b6<2$, $0<c3<4$) such as lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_3N$, or $Li_3PO_4-Li_2SSiS_2$, $P_2S_5$-based glass ($Li_{a7}P_{b7}S_{c5}$, $0<a7<3$, $0<b7<3$, $0<c5<7$) such as $LiI-Li_2S-P_2S_5$, or a mixture thereof.

In one embodiment, the additives or the inorganic particles may be contained in an amount of 0.1 wt % to 20 wt % with respect to the total weight of the electrolyte, but are not limited thereto.

The electrolyte may be prepared by polymerizing the compound according to a common method known in the art. For example, the electrolyte may be prepared by performing in-situ polymerization or coating polymerization of a composition containing the compound as an additive. The electrolyte for a secondary battery provided in one embodiment may have excellent high-temperature stability and ion conductivity, and thus may be efficiently used in a secondary battery.

In one embodiment, the compound contained in the additive is formed on a surface of an electrode to prevent direct contact between the electrode and the electrolyte, such that it is possible to prevent a side reaction between the electrode and the electrolyte at a high temperature, and to suppress a crack of a solid electrolyte interphase (SEI) due to contraction and expansion of the electrode during charging and discharging, thereby improving a lifespan of the electrode. That is, since the compound according to one embodiment may form a thermally stable SEI on the surface of the electrode, a battery employing the electrolyte according to one embodiment may have excellent high-temperature storage characteristics and excellent thermal stability.

In still another embodiment, there is provided a protective layer for an electrode containing the compound or the electrolyte additive for a secondary battery containing the compound. Accordingly, the compound according to one embodiment is not limited to use as an additive added to the electrolyte, and may be used for forming a protective layer in a secondary battery. The protective layer may be formed on a surface of an electrode or an electrode current collector to suppress further decomposition of the electrolyte or to improve a lifespan of the battery. For example, the protective layer may be used as a layer for protecting dendrites in the battery, and in this case, the layer may be a gel-polymer layer. Therefore, it is possible to improve cycle characteristics of the electrode of the secondary battery to improve the performance and lifespan of the battery.

In still another embodiment, there is provided a secondary battery including the electrolyte for a secondary battery.

An anode included in the secondary battery includes an anode current collector and an anode active material layer formed on the anode current collector, and the anode active material layer contains an anode active material. The anode active material is not particularly limited as long as it is generally used in the art. For example, the anode active material may be a silicon-based anode active material or a carbon-based anode active material. Specifically, the anode active material may include crystalline carbon such as graphite, for example, natural graphite, artificial graphite, or expandable graphite, graphene, fullerene soot, a carbon nanotube, or a carbon fiber; and amorphous carbon such as soft carbon (low temperature-calcined carbon), hard carbon, coke, mesocarbon microbead (MCMB) calcined at 1,500° C. or lower, or a mesophase pitch-based carbon fiber (MPCF). Alternatively, the anode active material may include Si, $SiO_x$ ($0<x<2$), a Si—Z alloy (where Z is an alkali metal, an alkaline earth metal, a Group 13 element, a Group 14 element, a Group 15 element, a Group 16 element, a transition metal, a rare earth element, or a combination element thereof, and Si is excluded in Z), or a combination thereof. The element Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. In addition, such a silicon-based anode active material such as Si, $SiO_x$, or a Si—Z alloy may include a substantially crystalline form (including a single crystal form and a polycrystal form), an amorphous form, or a mixed form thereof. In addition, the anode may further contain a compound commonly used as an anode active material.

A cathode included in the secondary battery includes a cathode current collector and a cathode active material layer formed on the cathode current collector, and the cathode active material layer contains a cathode active material. The cathode active material is not particularly limited as long as it is generally used in the art. For example, the cathode active material may include a cathode active material capable of intercalating and deintercalating lithium ions, such a cathode active material is a lithium-containing metal oxide, and any cathode active material may be used without limitation as long as it is commonly used in the art. For example, a composite metal oxide of lithium and a metal selected from cobalt, manganese, nickel, and a combination thereof may be used.

Specific examples of the cathode active material include compounds represented by any one of the following formulas: $Li_aA_{1-b}B_bD_2$ (where $0.90 \leq a \leq 1.8$, $0 \leq b \leq 0.5$); $Li_aE_{1-b}B_bO_{2-c}D_c$ (where $0.90 \leq a \leq 1.8$, $0 \leq b \leq 0.5$, $0 \leq c \leq 0.05$); $LiE_{2-b}B_bO_{4-c}D_c$ (where $0 \leq b \leq 0.5$, $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, $0 \leq \alpha \leq 2$); $Li_aNi_{1-b-c}Mn_bB_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, $0 < \alpha \leq 2$); $Li_aN-i_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2GbO_4$ (where $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof. Examples thereof include $LiCoO_2$, $LiMn_xO_{2x}$ (x=1, 2), $LiNi_{1-x}Mn_xO_{2x}$(0<x<1), $LiNi_{1-x-y}Co_xMn_yO_2$ ($0 \leq x \leq 0.5$, $0 \leq y \leq 0.5$), and $FePO_4$.

The cathode or the anode may be produced by dispersing an electrode active material, a binder, and a conductive material or a thickener in a solvent to prepare an electrode slurry composition, and applying the electrode slurry composition onto an electrode current collector. As the cathode current collector, aluminum, an aluminum alloy, or the like may be mainly used, and as the anode current collector, copper, a copper alloy, or the like may be mainly used. The cathode current collector and the anode current collector may be in a form of a foil or a mesh.

The secondary battery provided in one embodiment contains the electrolyte for a secondary battery, such that the secondary battery may exhibit sufficient performance even at a high temperature, and may obtain an effect of suppressing an increase in battery thickness due to suppression of generation of volatile materials. In addition, it is possible to improve a low resistance characteristic of the electrode and increase the lifespan of the battery. The secondary battery according to one embodiment may be formed into various shapes such as a cylindrical shape and a pouch shape, in addition to an angular shape. The secondary battery may be used for applications requiring a high voltage, a high output, and high-temperature driving, such as an electric vehicle, in addition to the existing application in a mobile phone, a portable computer, or the like. In addition, the secondary battery may also be used for a hybrid vehicle by being coupled to the existing internal combustion engine, fuel cell, supercapacitor, or the like, and may be used for an electric bike, a power tool, and other applications requiring a high voltage, a high output, and high-temperature driving.

Hereinafter, Examples and Experimental Examples will be described in detail below. However, Examples and Experimental Examples to be described below are merely illustrative of a part of the present disclosure, and the present disclosure is not limited thereto.

<Example 1> Preparation of Compound a

[Compound a]

[Reaction Formula a]

Step 1

Caffeic acid (5 g, 27.8 mmol), dimethylformamide (30 mL), and triethylamine (11.6 mL, 83.3 mmol) were added to a round-bottom flask, the temperature was raised to 90° C., and the mixture was stirred for 4 hours or longer. After completion of the reaction, the mixture was cooled to room temperature and dried in vacuo to remove triethylamine, a saturated NaCl aqueous solution (50 mL) and ethyl acetate (50 mL) were added, stirring was performed, an organic layer was separated, and then the solvent was removed under reduced pressure. Toluene (50 mL) was added, and then distillation was performed at 40° C. and 60 mbar to remove residual DMF, thereby obtaining 2.2 g of a compound a-i as an intermediate (yield: 58%).

$^1$H-NMR (500 MHz, DMSO): 6.85 (1H, s), 6.68 (2H, s), 6.53 (1H, q), 5.49 (1H, d), 4.98 (1H, d).

Step 2

The compound a-i (2 g, 10.3 mmol) prepared in Step 1, lithium hydroxide (0.12 g, 5.1 mmol), and boric acid (0.32 g, 5.1 mmol) were added to a round-bottom flask, methanol (10 mL) was added, and then the mixture was stirred at 70° C. for 3 hours. After completion of the reaction, methanol was removed to obtain a compound a of Example 1 as a white solid specimen (yield: 61%).

$^1$H-NMR (500 MHz, DMSO): 6.69 (1H, s), 6.54 (1H, d), 6.52 (1H, d), 6.43 (1H, d), 5.47 (1H, d), 4.91 (1H, d).

<Example 2> Preparation of Electrolyte

LiPF$_6$ at a concentration of 1.0 M was dissolved in a solution in which ethylene carbonate (EC) and ethylmethyl carbonate (EMC) were mixed at a weight ratio of 3:7, and 1 wt % of the compound according to Example 1 was added, thereby preparing an electrolyte according to Example 2.

<Experimental Example 1> Linear Sweep Voltammetry (LSV)

Analysis of Electrolyte

In order to measure a decomposition initiation voltage of the electrolyte according to Example 2 by linear sweep voltammetry (LSV) analysis, an experiment was conducted in the following manner, and for comparison, an electrolyte not containing the compound a of Example 1 was used as a reference electrolyte. Specifically, a platinum electrode was used as a working electrode, a lithium metal was used for a reference electrode and a counter electrode, and a measurement was performed at a scan rate of 0.1 mV/s in a voltage range of 3 V to 7 V. As an LSV measuring apparatus, Multi-Channel Potentiostat PMC-100 (manufactured by AMETEK, Inc.) was used. The results are illustrated in FIG. 1.

Figure 1:
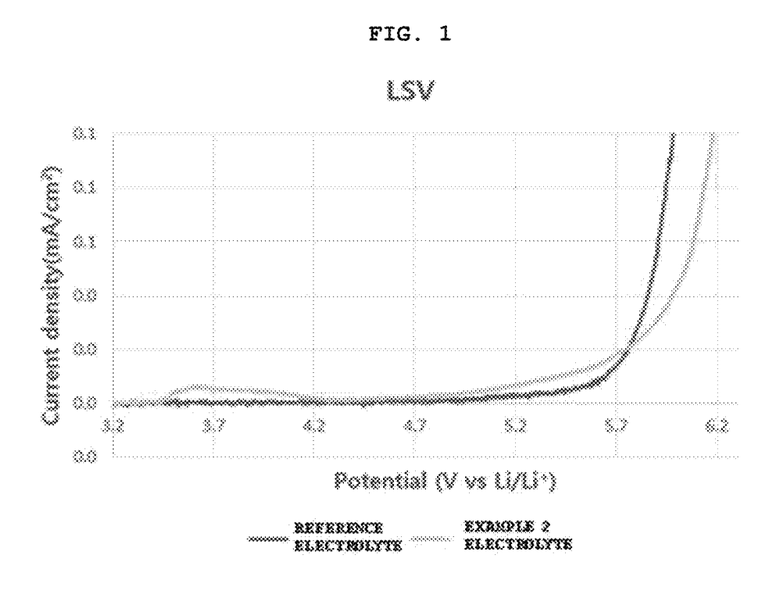
FIG. 1 is a view showing results of measuring a decomposition initiation voltage of an electrolyte according to Example 2 containing a compound according to Example 1 by linear sweep voltammetry analysis.

As a result, as can be seen in FIG. 1, it may be confirmed that the compound a according to Example 1 contained in the electrolyte of Example 2 is first decomposed near 3.4 V rather than the electrolyte solvent. Therefore, the compound a according to Example 1 is decomposed in the electrolyte before the electrolyte solvent, such that the compound a may protect the surface of the electrode, thereby improving the lifespan and high-temperature characteristics and reducing the resistance.

<Experimental Example 2> Cyclic Voltammetry (CV) Analysis of Electrolyte

In order to measure a current-voltage curve of the electrolyte according to Example 2 by cyclic voltammetry (CV) analysis, an experiment was conducted in the following manner. Specifically, graphite was used for a working electrode, and lithium was used for a counter electrode and a reference electrode, a CV measurement was performed for 3 cycles at a scan rate of 0.5 mV/s in a voltage range of 0 V to 3 V, and as a CV measuring apparatus, Multi-Channel Potentiostat PMC-100 (manufactured by AMETEK, Inc.) was used. The results are illustrated in FIG. 2.

Figure 2:
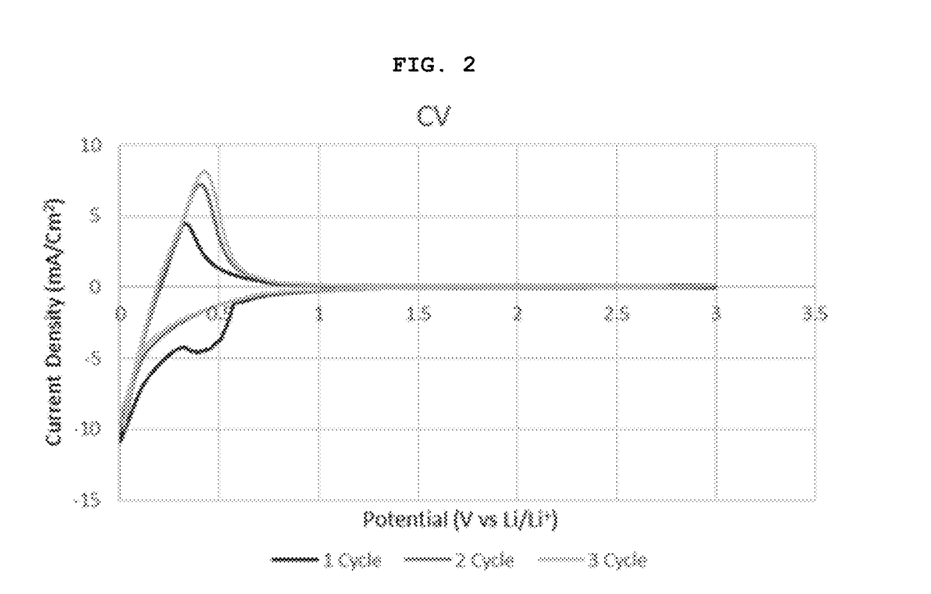
FIG. 2 is a view showing results of measuring a current-voltage curve of the electrolyte according to Example 2 containing the compound according to Example 1 by voltammetry analysis.

As a result, as can be seen in FIG. 2, it may be confirmed that the decomposition of the compound a according to Example 1 occurs first and a solid electrolyte interphase (SEI) is formed since the decomposition starts from 0.6 V before reaching an electrolyte decomposition voltage of 0.3 V. In addition, a fact that a stable protective layer is formed may be confirmed through the smooth curves in the second and third cycles without further decomposition. Therefore, the compound a according to Example 1 is decomposed in the electrolyte before the electrolyte solvent to form a protective layer on the surface of the electrode, such that further decomposition of the electrolyte may be suppressed, thereby improving the low resistance characteristic of the electrode and increasing the lifespan of the battery.

The present disclosure relates to a novel boron-containing compound and an electrolyte additive for a secondary battery containing the same. An electrolyte for a secondary battery provided in one embodiment contains the novel boron-containing compound, such that decomposition of the electrolyte may be suppressed, thereby improving a capacity and a lifespan of the battery.

Hereinabove, the present disclosure has been described in detail through preferred Examples and Experimental Examples, but the scope of the present disclosure is not limited to a specific Example, and should be interpreted according to the appended claims. In addition, those skilled in the art should understand that various modifications and alternations are possible without departing from the scope of the present disclosure.

What is claimed is:

1. A compound represented by the following Chemical Formula 1:

[Chemical Formula 1]

M$^+$
[Chemical Formula 2]

in Chemical Formula 1,
X$^1$ and X$^2$ are each independently a substituted or unsubstituted compound represented by Chemical Formula 2 or substituted or unsubstituted C$_{2-15}$ alkenyl;
n and m are each independently an integer of 0 to 15, and A is a bond or —C(=O)—;
x is an integer of 0 to 4;
y is an integer of 1 to 4;
Y's are each independently a bond, —CH$_2$—, or —CH$_2$CH$_2$—; and
M is an alkali metal.

2. The compound of claim 1, wherein X$^1$ and X$^2$ are each independently a substituted or unsubstituted compound represented by Chemical Formula 2 or substituted or unsubstituted C$_{2-10}$ alkenyl;
n and m are each independently an integer of 0 to 10, and A is a bond;
x and y are each independently an integer of 1 to 3; and
Y's are each independently a bond or —CH$_2$—.

3. The compound of claim 1, wherein X$^1$ and X$^2$ are each independently substituted or unsubstituted C$_{2-5}$ alkenyl.

4. The compound of claim 1, wherein M is lithium, sodium, potassium, or cesium.

5. The compound of claim 1, wherein the compound represented by Chemical Formula 1 is any one selected from the group consisting of compounds represented by the following Chemical Formulas (1) to (7):

(1)

(2)

(3)

(4)

(5)

(6)

(7)

6. An electrolyte additive for a secondary battery comprising a compound represented by the following Chemical Formula 1:

[Chemical Formula 1]

[Chemical Formula 2]

in Chemical Formula 1, $X^1$ and $X^2$ are each independently a substituted or unsubstituted compound represented by Chemical Formula 2 or substituted or unsubstituted $C_{2-13}$ alkenyl;

n and m are each independently an integer of 0 to 15, and A is a bond or —C(=O)—;

x is an integer of 0 to 4;

y is an integer of 1 to 4;

Y's are each independently a bond, —$CH_2$—, or —$CH_2CH_2$—; and

M is an alkali metal.

7. The electrolyte additive of claim 6, wherein $X^1$ and $X^2$ are each independently a substituted or unsubstituted compound represented by Chemical Formula 2 or substituted or unsubstituted $C_{2-10}$ alkenyl;

n and m are each independently an integer of 0 to 10, and A is a bond;

x and y are each independently an integer of 1 to 3; and

Y's are each independently a bond or —$CH_2$—.

8. The electrolyte additive of claim 6, wherein $X^1$ and $X^2$ are each independently substituted or unsubstituted $C_{2-5}$ alkenyl.

9. The electrolyte additive of claim 6, wherein M is lithium, sodium, potassium, or cesium.

10. The electrolyte additive of claim 6, wherein the compound represented by Chemical Formula 1 is any one selected from the group consisting of compounds represented by the following Chemical Formulas (1) to (7):

(1)

(2)

11. An electrolyte for a secondary battery comprising the electrolyte additive for a secondary battery according to claim 6.

12. A protective layer for an electrode comprising the electrolyte additive for a secondary battery according to claim 6.

13. A secondary battery comprising the electrolyte for a secondary battery according to claim 11.

* * * * *

UNITED STATES PATENT AND TRADEMARK OFFICE
CERTIFICATE OF CORRECTION

PATENT NO. : 11,851,448 B2
APPLICATION NO. : 18/075610
DATED : December 26, 2023
INVENTOR(S) : Myoung Lae Kim et al.

Page 1 of 1

It is certified that error appears in the above-identified patent and that said Letters Patent is hereby corrected as shown below:

In the Claims

In Column 14, Line 19, please change "$C_{2-13}$" to --$C_{2-15}$--

Signed and Sealed this
Twenty-fourth Day of September, 2024

Katherine Kelly Vidal
*Director of the United States Patent and Trademark Office*